US 9,218,316 B2

(12) United States Patent
Bernstein et al.

(10) Patent No.: US 9,218,316 B2
(45) Date of Patent: Dec. 22, 2015

(54) REMOTELY CONTROLLING A SELF-PROPELLED DEVICE IN A VIRTUALIZED ENVIRONMENT

(71) Applicant: Orbotix, Inc., Boulder, CO (US)

(72) Inventors: Ian Bernstein, Boulder, CO (US); Adam Wilson, Longmont, CO (US); Jonathan Carroll, Boulder, CO (US); Fabrizio Polo, Boulder, CO (US)

(73) Assignee: Sphero, Inc., Boulder, CO (US)

( * ) Notice: Subject to any disclaimer, the term of this patent is extended or adjusted under 35 U.S.C. 154(b) by 198 days.

(21) Appl. No.: 13/766,455

(22) Filed: Feb. 13, 2013

(65) Prior Publication Data

US 2013/0173089 A1 Jul. 4, 2013

Related U.S. Application Data

(63) Continuation-in-part of application No. 13/342,853, filed on Jan. 3, 2012, now Pat. No. 8,571,781.

(60) Provisional application No. 61/430,023, filed on Jan. 5, 2011, provisional application No. 61/430,083, filed on Jan. 5, 2011, provisional application No. 61/553,923, filed on Oct. 31, 2011.

(51) Int. Cl.
*G05D 1/00* (2006.01)
*G05D 3/00* (2006.01)
*G06F 17/00* (2006.01)
(Continued)

(52) U.S. Cl.
CPC ............... *G06F 17/00* (2013.01); *A63H 30/04* (2013.01); *A63H 33/005* (2013.01); *B62D 63/025* (2013.01); *G05D 1/0016* (2013.01); *G05D 1/0044* (2013.01); *G05D 1/027* (2013.01); *G05D 1/0259* (2013.01); *G05D 1/0278* (2013.01); *G05D 2201/0214* (2013.01); *Y10S 901/01* (2013.01)

(58) Field of Classification Search
CPC . G05D 1/0016; G05D 1/0044; G05D 1/0259; G05D 1/027; G05D 1/0278; G05D 2201/0214; G06F 17/00; B62D 63/025; Y10S 901/01; A63H 30/04; A63H 33/005
See application file for complete search history.

(56) References Cited

U.S. PATENT DOCUMENTS 3,683,216 A 8/1972 Post
4,996,468 A 2/1991 Field et al.
(Continued)

FOREIGN PATENT DOCUMENTS

DE 101 46 862 A1 5/2002
JP 03182290 A 8/1991
(Continued)

OTHER PUBLICATIONS

Non-Final Office Action mailed May 13, 2013, for related U.S. Appl. No. 13/342,874, filed Jan. 3, 2012, 17 pages.
(Continued)

*Primary Examiner* — Mary Cheung
(74) *Attorney, Agent, or Firm* — Mahamedi Paradice LLP

(57) ABSTRACT

A computing device operating as a controller can obtain image data from a camera component. The computing device can determine a location of the self-propelled device relative to the camera based on the image data. A virtual content may be generated on the computing device based at least in part on the location of the self-propelled device.

19 Claims, 5 Drawing Sheets

(51) Int. Cl.
  *B62D 63/02* (2006.01)
  *A63H 30/04* (2006.01)
  *A63H 33/00* (2006.01)
  *G05D 1/02* (2006.01)

(56) References Cited

U.S. PATENT DOCUMENTS

| | | | |
|---|---|---|---|
| 5,297,981 A | 3/1994 | Maxim et al. | |
| 6,227,933 B1 | 5/2001 | Michaud et al. | |
| 6,246,927 B1 | 6/2001 | Dratman | |
| 6,458,008 B1 | 10/2002 | Hyneman | |
| 6,459,955 B1 | 10/2002 | Bartsch et al. | |
| 6,573,883 B1 | 6/2003 | Bartlett | |
| 6,615,109 B1 | 9/2003 | Matsuoka et al. | |
| 6,764,373 B1 | 7/2004 | Osawa et al. | |
| 6,785,590 B2 | 8/2004 | Kasuga et al. | |
| 6,786,795 B1 | 9/2004 | Mullaney et al. | |
| 6,945,843 B1 | 9/2005 | Motosko | |
| 6,980,956 B1 | 12/2005 | Takagi et al. | |
| 7,069,113 B2 | 6/2006 | Matsuoka et al. | |
| 7,130,741 B2 | 10/2006 | Bodin et al. | |
| 7,170,047 B2 | 1/2007 | Pal | |
| 7,173,604 B2 | 2/2007 | Marvit et al. | |
| 7,258,591 B2 | 8/2007 | Xu et al. | |
| 7,340,077 B2 | 3/2008 | Gokturk et al. | |
| 7,344,430 B2 | 3/2008 | Hasty et al. | |
| 7,432,718 B2 | 10/2008 | Ishihara et al. | |
| 7,526,362 B2 | 4/2009 | Kim et al. | |
| 7,714,880 B2 | 5/2010 | Johnson | |
| 7,822,507 B2 | 10/2010 | Ishihara et al. | |
| 7,847,504 B2 | 12/2010 | Hollis | |
| 7,853,357 B2 | 12/2010 | Sawada et al. | |
| 7,979,162 B2 | 7/2011 | Niemela et al. | |
| 8,025,551 B2 | 9/2011 | Torres et al. | |
| 8,038,504 B1 | 10/2011 | Wong | |
| 8,099,189 B2 | 1/2012 | Kaznov et al. | |
| 8,128,450 B2 | 3/2012 | Imai | |
| 8,128,500 B1 | 3/2012 | Borst et al. | |
| 8,142,287 B2 | 3/2012 | Podoloff | |
| 8,180,436 B2 | 5/2012 | Boyden et al. | |
| 8,197,298 B2 | 6/2012 | Willett | |
| 8,258,917 B2 | 9/2012 | Cai et al. | |
| 8,274,406 B2 | 9/2012 | Karlsson et al. | |
| 8,275,544 B1 | 9/2012 | Wells et al. | |
| 8,326,469 B2 | 12/2012 | Phillips et al. | |
| 8,330,639 B2 | 12/2012 | Wong et al. | |
| 8,352,643 B2 | 1/2013 | Birnbaum et al. | |
| 8,355,818 B2 | 1/2013 | Nielsen et al. | |
| 8,364,136 B2 | 1/2013 | Hoffberg et al. | |
| 8,392,065 B2 | 3/2013 | Tolstedt et al. | |
| 8,396,611 B2 | 3/2013 | Phillips et al. | |
| 8,417,384 B2 | 4/2013 | Togawa et al. | |
| 8,456,298 B2 | 6/2013 | Valtonen | |
| 8,571,781 B2 | 10/2013 | Bernstein et al. | |
| 8,577,595 B2 | 11/2013 | Zhao et al. | |
| 8,670,889 B2 | 3/2014 | Kaznov | |
| 2003/0093182 A1 | 5/2003 | Yokoyama | |
| 2004/0002843 A1 | 1/2004 | Robarts et al. | |
| 2004/0182614 A1 | 9/2004 | Wakui | |
| 2004/0186623 A1 | 9/2004 | Dooley et al. | |
| 2005/0004723 A1 | 1/2005 | Duggan et al. | |
| 2005/0186884 A1 | 8/2005 | Evans | |
| 2005/0226192 A1 | 10/2005 | Red et al. | |
| 2005/0264472 A1 | 12/2005 | Rast | |
| 2006/0095158 A1 | 5/2006 | Lee et al. | |
| 2006/0101465 A1 | 5/2006 | Kato et al. | |
| 2006/0164261 A1 | 7/2006 | Stiffler | |
| 2006/0241812 A1 | 10/2006 | Jung | |
| 2006/0271251 A1 | 11/2006 | Hopkins | |
| 2007/0034734 A1 | 2/2007 | Yoeli | |
| 2007/0085706 A1 | 4/2007 | Feyereisen et al. | |
| 2007/0112462 A1 | 5/2007 | Kim et al. | |
| 2007/0249422 A1 | 10/2007 | Podoloff | |
| 2007/0259592 A1 | 11/2007 | Imai et al. | |
| 2007/0282484 A1 | 12/2007 | Chung et al. | |
| 2008/0009965 A1* | 1/2008 | Bruemmer et al. | 700/245 |
| 2008/0033641 A1 | 2/2008 | Medalia | |
| 2008/0077284 A1 | 3/2008 | Swope | |
| 2008/0121097 A1 | 5/2008 | Rudakevych et al. | |
| 2008/0174268 A1 | 7/2008 | Koo et al. | |
| 2008/0174448 A1 | 7/2008 | Hudson | |
| 2008/0240507 A1 | 10/2008 | Niwa et al. | |
| 2008/0263628 A1 | 10/2008 | Norman et al. | |
| 2008/0267450 A1 | 10/2008 | Sugimoto et al. | |
| 2008/0269949 A1 | 10/2008 | Norman et al. | |
| 2009/0033623 A1 | 2/2009 | Lin | |
| 2009/0055019 A1 | 2/2009 | Stiehl et al. | |
| 2009/0057238 A1 | 3/2009 | Garti | |
| 2009/0073034 A1* | 3/2009 | Lin | 342/357.07 |
| 2009/0081923 A1 | 3/2009 | Dooley et al. | |
| 2009/0171516 A1 | 7/2009 | Reich | |
| 2009/0198371 A1* | 8/2009 | Emanuel et al. | 700/226 |
| 2009/0204261 A1 | 8/2009 | Strand et al. | |
| 2009/0222148 A1 | 9/2009 | Knotts et al. | |
| 2009/0226035 A1 | 9/2009 | Iihoshi et al. | |
| 2009/0256822 A1 | 10/2009 | Amireh et al. | |
| 2009/0262074 A1 | 10/2009 | Nasiri et al. | |
| 2009/0265671 A1 | 10/2009 | Sachs et al. | |
| 2009/0278932 A1 | 11/2009 | Yi | |
| 2009/0284553 A1 | 11/2009 | Seydoux | |
| 2010/0004798 A1 | 1/2010 | Bodin et al. | |
| 2010/0010669 A1 | 1/2010 | Lee et al. | |
| 2010/0032224 A1 | 2/2010 | Liu | |
| 2010/0063652 A1 | 3/2010 | Anderson | |
| 2010/0066676 A1 | 3/2010 | Kramer et al. | |
| 2010/0084513 A1 | 4/2010 | Gariepy et al. | |
| 2010/0090661 A1 | 4/2010 | Chen et al. | |
| 2010/0106344 A1 | 4/2010 | Edwards et al. | |
| 2010/0145236 A1 | 6/2010 | Greenberg et al. | |
| 2010/0169098 A1 | 7/2010 | Patch | |
| 2010/0172287 A1 | 7/2010 | Krieter | |
| 2010/0183195 A1 | 7/2010 | Sharma | |
| 2010/0234993 A1 | 9/2010 | Seelinger et al. | |
| 2010/0241289 A1 | 9/2010 | Sandberg | |
| 2010/0261526 A1 | 10/2010 | Anderson et al. | |
| 2010/0305778 A1 | 12/2010 | Dorneich et al. | |
| 2010/0305781 A1 | 12/2010 | Felix | |
| 2010/0312917 A1* | 12/2010 | Allport | 710/5 |
| 2010/0324753 A1 | 12/2010 | Okumatsu | |
| 2011/0003640 A9 | 1/2011 | Ehrman | |
| 2011/0018731 A1 | 1/2011 | Linsky et al. | |
| 2011/0018794 A1 | 1/2011 | Linsky et al. | |
| 2011/0022196 A1 | 1/2011 | Linsky et al. | |
| 2011/0035054 A1 | 2/2011 | Gal et al. | |
| 2011/0050940 A1 | 3/2011 | Lanz et al. | |
| 2011/0060492 A1 | 3/2011 | Kaznov | |
| 2011/0065488 A1 | 3/2011 | Okamura et al. | |
| 2011/0071652 A1 | 3/2011 | Brown et al. | |
| 2011/0071702 A1 | 3/2011 | Wang et al. | |
| 2011/0082566 A1 | 4/2011 | Herr et al. | |
| 2011/0087371 A1 | 4/2011 | Sandberg et al. | |
| 2011/0153885 A1 | 6/2011 | Mak et al. | |
| 2011/0184590 A1 | 7/2011 | Duggan et al. | |
| 2011/0213278 A1 | 9/2011 | Horak et al. | |
| 2011/0234488 A1 | 9/2011 | Ge et al. | |
| 2011/0250967 A1 | 10/2011 | Kulas | |
| 2011/0273379 A1 | 11/2011 | Chen et al. | |
| 2011/0291926 A1 | 12/2011 | Gokturk et al. | |
| 2011/0313568 A1 | 12/2011 | Blackwell et al. | |
| 2011/0320830 A1 | 12/2011 | Ito | |
| 2012/0009845 A1 | 1/2012 | Schmelzer | |
| 2012/0035799 A1 | 2/2012 | Ehrmann | |
| 2012/0065747 A1 | 3/2012 | Brown et al. | |
| 2012/0083945 A1 | 4/2012 | Oakley et al. | |
| 2012/0083962 A1 | 4/2012 | Sato et al. | |
| 2012/0106783 A1 | 5/2012 | Chang et al. | |
| 2012/0143482 A1 | 6/2012 | Goossen et al. | |
| 2012/0146775 A1 | 6/2012 | Kudo et al. | |
| 2012/0149359 A1 | 6/2012 | Huang | |
| 2012/0167014 A1 | 6/2012 | Joo et al. | |
| 2012/0173018 A1 | 7/2012 | Allen et al. | |
| 2012/0173047 A1 | 7/2012 | Bernstein et al. | |
| 2012/0173049 A1 | 7/2012 | Bernstein et al. | |
| 2012/0185115 A1 | 7/2012 | Dean | |

(56) References Cited

U.S. PATENT DOCUMENTS

| | | | |
|---|---|---|---|
| 2012/0193154 | A1 | 8/2012 | Wellborn et al. |
| 2012/0197439 | A1 | 8/2012 | Wang et al. |
| 2012/0215355 | A1 | 8/2012 | Bewley et al. |
| 2012/0244969 | A1 | 9/2012 | Binder |
| 2012/0291926 | A1 | 11/2012 | Misra et al. |
| 2012/0298049 | A1 | 11/2012 | Cook et al. |
| 2012/0298430 | A1 | 11/2012 | Schroll et al. |
| 2012/0306850 | A1* | 12/2012 | Balan et al. ............. 345/419 |
| 2012/0307001 | A1 | 12/2012 | Osako et al. |
| 2012/0309261 | A1 | 12/2012 | Boman et al. |
| 2012/0311810 | A1 | 12/2012 | Gilbert et al. |
| 2013/0050069 | A1 | 2/2013 | Ota |
| 2013/0065482 | A1 | 3/2013 | Trickett |
| 2013/0109272 | A1 | 5/2013 | Rindlisbacher |
| 2013/0143482 | A1 | 6/2013 | Regier |
| 2013/0265225 | A1 | 10/2013 | Nasiri et al. |
| 2014/0371954 | A1 | 12/2014 | Lee et al. |

FOREIGN PATENT DOCUMENTS

| | | |
|---|---|---|
| JP | 09254838 A | 9/1997 |
| JP | 2000218578 A | 8/2000 |
| JP | 2008-040725 A | 2/2008 |
| KR | 10-2008-040725 A | 8/2008 |
| KR | 10-2008-0073626 A | 8/2008 |
| KR | 10-2008-0092595 A | 10/2008 |
| KR | 10-2009-0000013 A | 1/2009 |
| KR | 10-0969873 B1 | 7/2010 |
| WO | WO-97/25239 A1 | 7/1991 |
| WO | WO-2006/049559 A1 | 5/2006 |
| WO | WO-2012/094349 A2 | 7/2012 |

OTHER PUBLICATIONS

Non-Final Office Action mailed Jun. 3, 2013, for related U.S. Appl. No. 13/342,914, filed Jan. 3, 2012, 32 pages.

Koshiyama et al., Machine Translation for JP 2000-218578, Aug. 8, 2000, 11 Pages.

Non-Final Office Action mailed Jun. 13, 2013, for related U.S. Appl. No. 13/342,908, filed Jan. 3, 2012, 36 pages.

GearBox Ball Prototype Jun. 29, 2010, Pictures from Video [online]. Orbotix, Inc., Jun. 30, 2010, 91 pages. Retrieved from the internet:<URL: http://www.youtube.com/watch?v=qRBM7bAaXpU>.

Notification of Transmittal of International Search Report and The Written Opinion of the International Searching Authority mailed Aug. 28, 2013, for related PCT Application No. PCT/US2013/041023 filed May 14, 2013, 11 pages.

Non-Final Office Action mailed Dec. 20, 2013, for related U.S. Appl. No. 13/342,908, filed Jan. 3, 2012, 28 pages.

Liu, Dalian et al., "Motion Control of a Spherical Mobile Robot by Feedback Linearization," 7th WC on IC&A, Jun. 27, 2008,Chongqing, China, pp. 965-970. 6 pages.

Shu, Guanghui et al., "Motion Control of Spherical Robot Based on Conservation of Angular Momentum," IEEE Intl Conf on Mechatronics & Automation, Changchun, China, pp. 599-604. 6 pages, Aug. 9-12, 2009.

Joshi, Vrunda et al., "Design, modeling and controllability of a spherical mobile robot", 13th Natl Conf on Mechanisms &Machines (NaCoMM07) IISc, Bangalore, India, Dec. 13, 2007, pp. 1-6.

Harmo, Panu et al., "Moving Eye—Interactive Telepresence over Internet with a Ball Shaped Mobile Robot," Automation TechLab, Finland, Oct. 2, 2001. 6 pages. http://automation.tkk.fi/files/tervetaas/MovingEye4.pdf.

Halme, Aarne, et al., "Motion Control of a Spherical Mobile Robot", Helsinki, IEEE AMC '1996, pp. 259-264. 6 pages.

Non-Final Office Action mailed Apr. 29, 2013, for related U.S. Appl. No. 13/342,874, filed Jan. 3, 2012, 47 pages.

Final Office Action mailed Jun. 6, 2014, for related U.S. Appl. No. 13/342,908, filed Jan. 3, 2012, 32 pages.

U.S. Appl. No. 61/362,005, filed Jul. 7, 2010, 10 pages.

Non-Final Office Action mailed Oct. 16, 2012, for related U.S. Appl. No. 13/342,853, filed Feb. 19, 2013, 10 pages.

Non-Final Office Action mailed Apr. 9, 2013, for related U.S. Appl. No. 13/342,892, filed Jan. 3, 2013, 19 pages.

Notification of Transmittal of International Search Report and The Written Opinion of The International Searching Authority mailed Dec. 3, 2012, for related PCT Application No. PCT/US2012/020115 filed Jan. 3, 2012, 11 pages.

Non-Final Office Action mailed Apr. 16, 2013, for related U.S. Appl. No. 13/342,884, filed Jan. 3, 2013, 20 pages.

Notice of Allowance mailed Apr. 19, 2013, for related U.S. Appl. No. 13/342,853, filed Feb. 19, 2013, 11 pages.

Notification of Transmittal of International Search Report and The Written Opinion of The International Searching Authority mailed Oct. 15, 2013, for related PCT Application No. PCT/US2013/050327 filed Jul. 12, 2013, 13 pages.

Final Office Action mailed Nov. 15, 2013, for related U.S. Appl. No. 13/342,892, filed Jan. 3, 2013, 21 pages.

Final Office Action mailed Nov. 18, 2013, for related U.S. Appl. No. 13/342,884, filed Jan. 3, 2013, 19 pages.

Final Office Action mailed Nov. 18, 2013, for related U.S. Appl. No. 13/342,874, filed Jan. 3, 2012, 21 pages.

Final Office Action mailed Nov. 13, 2013, for related U.S. Appl. No. 13/342,914, filed Jan. 3, 2012, 30 pages.

European Search Report and European Search Opinion mailed Nov. 6, 2014, for related EP Application No. 12731945.7 filed Jul. 26, 2013. 7 pages.

International Search Report and The Written Opinion mailed Dec. 17, 2014, for Application No. PCT/US2014/059973 filed Sep. 10, 2014, 13 pages.

U.S. Appl. No. 61/362,005, filed Jul. 7, 2010, Schmelzer, Richard.

"Roll, Pitch, and Yaw 1/ How Things Fly", How Things Fly website, date unknown, retrieved from https://howthingsfly.si.edu/flight-dynamics/roll-pitch-and-yaw.

* cited by examiner

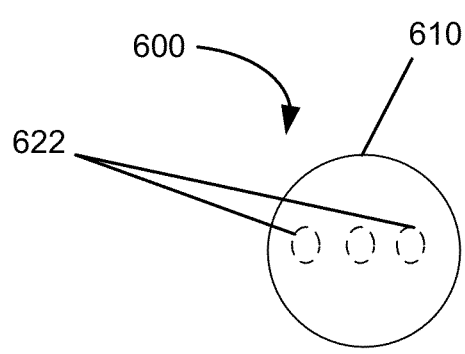 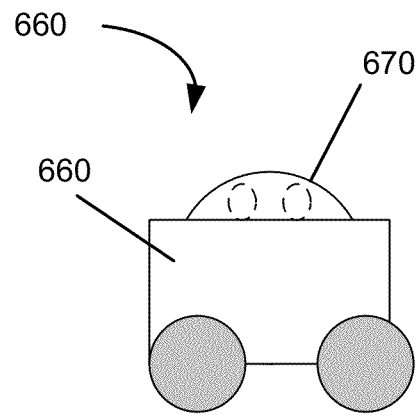
FIG. 6A    FIG. 6B

REMOTELY CONTROLLING A SELF-PROPELLED DEVICE IN A VIRTUALIZED ENVIRONMENT

RELATED APPLICATIONS

This Application is a Continuation-in-Part of U.S. patent application Ser. No. 13/342,853, entitled "SELF-PROPELLED DEVICE WITH ACTIVELY ENGAGED DRIVE SYSTEM", filed Jan. 3, 2012, which claims benefit of priority to the following: U.S. Provisional Application No. 61/430,023, entitled "METHOD AND SYSTEM FOR CONTROLLING A ROBOTIC DEVICE, filed Jan. 5, 2011; U.S. Provisional Application No. 61/430,083, entitled "SYSTEM AND METHOD FOR ESTABLISHING 2-WAY COMMUNICATION FOR CONTROLLING A ROBOTIC DEVICE", filed Jan. 5, 2011 and U.S. Provisional Application No. 61/553,923, entitled "A SELF-PROPELLED DEVICE AND SYSTEM FOR CONTROLLING SAME", filed Oct. 31, 2011; all of the aforementioned priority applications being hereby incorporated by reference in their respective entirety for all purposes.

TECHNICAL FIELD

Examples described herein relate to remote control of devices, and more specifically, to implementing remotely controlling devices in a virtualized environment.

BACKGROUND

Various kinds of remotely controllable devices exist. For example hobbyists often operate "RC" devices in the form of cars, trucks, airplanes and helicopters. Such devices typically receive commands from a controller device, and after movement (e.g., direction or velocity) based on the input. Some devices use software-based controllers, which can be implemented in the form of an application running on a device such as a smart phone or a tablet.

BRIEF DESCRIPTION OF THE DRAWINGS

FIG. 6A and FIG. 6B illustrate examples of self-propelled devices, under some embodiments.

DETAILED DESCRIPTION

According to some embodiments, a computing device is operated to process image data in order to track a movement or position of a self-propelled device.

Still further, in some embodiments, a self-propelled device is tracked, and position information determined from tracking the self-propelled device is integrated with a virtual environment. The virtual environment can include facets that are based on the position and/or state of the object, as well as on other aspects of the real-world environment as determined from tracking and/or communicating with the self-propelled device.

In an embodiment, image data is generated by a camera component. The camera component can be provided as part of, or alternatively coupled to, a computing device that acts as a controller for a self-propelled device. From the image data, a location of the self-propelled device can be determined (e.g., relative to the computing device). Content can be generated based at least in part on the location of the self-propelled device as the self-propelled device is moved or otherwise operated through the controller.

In some variations, sensor input is received from the self-propelled device. In particular, the sensor input can be indicative of the position of the self-propelled device. By way of example, the self-propelled device can include a gyroscope, an inertial mass unit (IMU), a GPS, an accelerometer, a light sensor, and/or proximity sensor. The sensor information communicated from the self-propelled device can include readings or output from the sensors. Additionally, the sensor information communicated from the self-propelled device can be in raw form, or in processed form (e.g., numerical values determined from a combination of sensors).

According to another embodiment, a computing device operating as a controller can obtain image data from a camera component. The computing device can determine a location of the self-propelled device relative to the camera based on the image data. A virtual content may be generated on the computing device based at least in part on the location of the self-propelled device.

As used herein, the term "substantially" means at least almost entirely. In quantitative terms, "substantially" means at least 80% of a stated reference (e.g., quantity of shape).

In similar regard, "spherical" or "sphere" means "substantially spherical." An object is spherical if it appears rounded, contoured or elliptical to a user. Objects which include, for example, half-domes, quarter-domes, elliptical (dimension of one axis larger than another) can be considered spherical as used herein.

DETAILED DESCRIPTION

Figure 1:
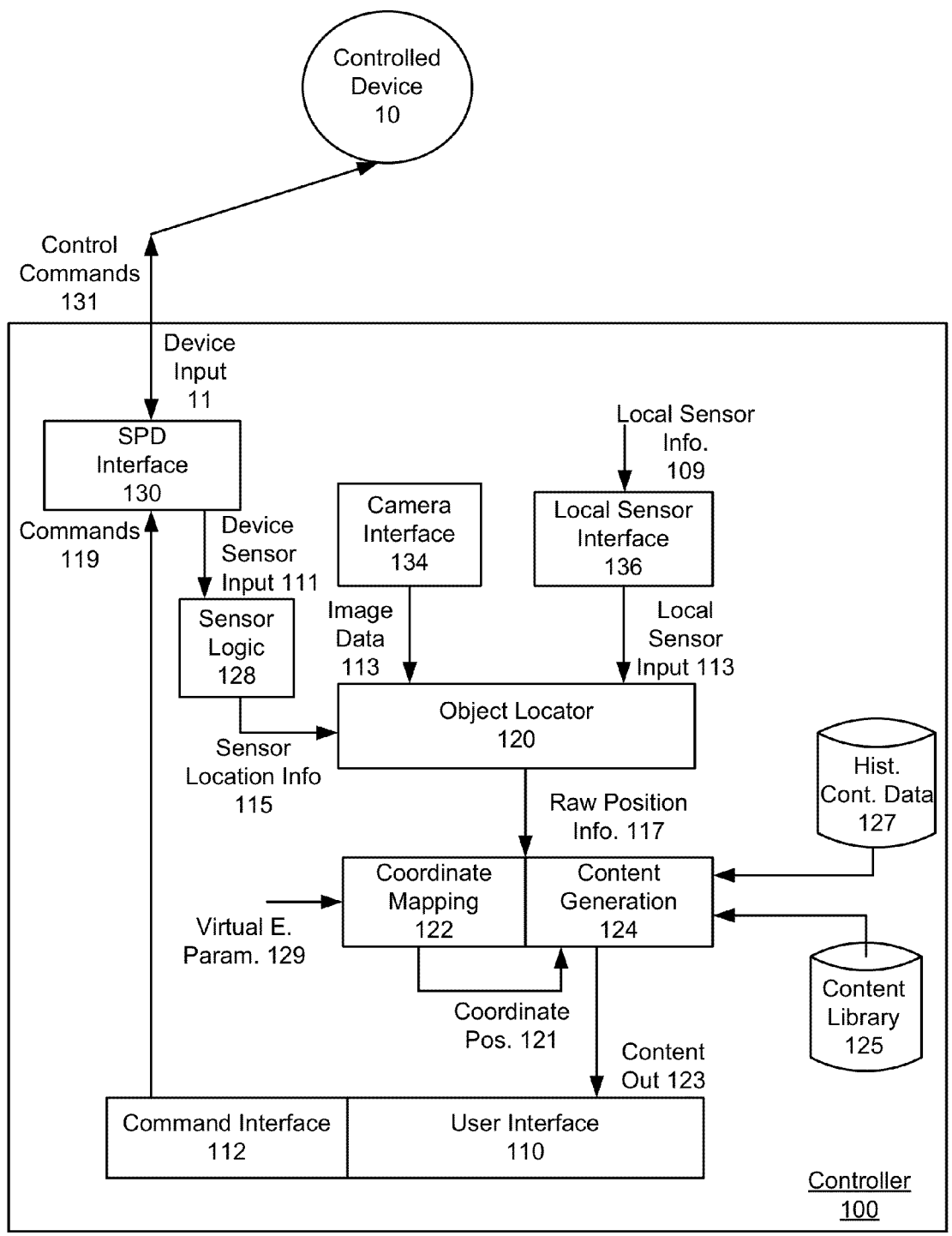
FIG. 1 illustrates a system for implementing a remotely controlling a self-propelled device in context of a virtual environment, according to an embodiment.

FIG. 1 illustrates a system for remotely controlling a self-propelled device in context of a virtual environment, according to an embodiment. In FIG. 1, system 50 includes a controller and a self-propelled device ("SPD") 10. The controller 100 can correspond to, for example, a mobile computing device, such as a voice/telephony device for cellular communications, or a roaming device that can use local wireless or similar communications to communicate with network nodes and/or other devices. By way of example, controller 100 can correspond to a smart phone, tablet, netbook are other mobile computing device that utilizes application layer logic (e.g., downloaded application or "app") or other programming to control the SPD 10. In variations, the controller 100 can be implemented as a dedicated or specialized device that controls self-propelled devices.

As described by various embodiments, SPD 10 can be operated to move under control of another device, such controller 100. In some embodiments, SPD 10 is configured with resources that enable one or more of the following: (i) maintain self-awareness of orientation and/or position relative to an initial reference frame after the device initiates movement; (ii) process control input programmatically, so as to enable a diverse range of program-specific responses to different control inputs; (iii) enable another device to control its movement using software or programming logic that is communicative with programming logic on the self-propelled device; and/or (iv) generate an output response for its movement and state that it is software interpretable by the control device.

With further reference to FIG. 1, controller 100 includes a user interface 110 an object detector 120, and an SPD interface 130. As described in greater detail, the user interface 110 can be operated to generate content that is based partially on the SPD 10, and/or the location of the SPD 10 relative to the controller 100. In particular, the user interface 110 can be used to generate content that provides a virtual (or augmented reality) context for the SPD 10. The user interface 110 can also include a command interface 112 that translates user input and/or other events into commands 119 for controlling the SPD 10 via the SPD interface 130.

In operation, controller 100 may include a camera interface 134, which obtains image data 113 depicting a real-time state of the SPD 10 in a scene that is captured by the camera of the controller 100. In one embodiment, the camera interface 134 receives image data that represents a series of images (or a video) of the scene in which the SPD 10 is present (e.g., moving under control of the controller 100). The object detector 120 can include image processing logic to analyze the image data 113, and to identify objects of interest from the image data 113. In particular, the object detector 120 can process the image data 113 in order to identify a depiction of the SPD 10, and optionally, a depiction of objects or landmarks in the scene that are deemed to be of interest.

In some implementations, the object detector 120 includes image analysis logic for analyzing image data 113 for presence of spheres, half spheres or portions thereof (e.g., quadrant of sphere). Thus, object detector 120 can include image processing logic for locating a shape that is indicative of SPD 10 (e.g., detect circle or portion thereof that is indicative of a spherical aspect of the SPD 10). Other characteristics such as illumination (e.g., LED illumination) or structural features of the SPD 10 can also be used to both detect the SPD 10, or to detect an orientation or other aspect of the SPD 10 in its environment. The object detector 120 can also include image processing resources that are configured to detect other specific kinds of objects other than spheres, such as objects typically encountered in the real world environment of SPD 10. These can include, for example, wall structures, table legs, or surfaces (e.g., carpet, grass etc.).

In one implementation, object detector 120 uses dimensional analysis to determine, from the image data 113, a relative position or distance of the SPD 10 from controller 100. In particular, one embodiment provides for the SPD 10 to be spherical. The object detector 120 can use dimensional analysis by comparing a dimension of the depiction for the SPD 10 (e.g., circle or portion thereof) with a reference dimension for the spherical housing of the self-propelled device.

In one variation, the controller 100 can also use local sensor information 109, provided from sensor devices resident on the computing device of controller 100. For example, local sensor information 109 can be provided by an accelerometer, gyroscope, magnetometer, or Global Positioning System (GPS) device that is resident on the computing device of the controller 100. As an addition or alternative, some implementations provide for the controller 100 to use the relative height of the controller 100 (e.g., distance from ground), and/or the orientation of the controller 100 with respect to a horizontal plane, in order to determine position information for the SPD 10.

As an addition or alternative, SPD 10 can communicate sensor input 11 to the controller 100. The sensor input 11 can correspond to, for example, information determined from an inertial mass unit ("IMU"), gyroscope, accelerometer, magnetometer, or GPS. The sensor input 11 can be either raw data, or data processed on the SPD 10 before being communicated to the controller 100. In variations, the controller 100 includes sensor logic 128, either with the object detector 120, or as a separate logical component (e.g., plug-in), to handle device sensor input 111 (corresponding to sensor input 11 provided from the SPD 10). The sensor logic 128 can determine sensor location information 115, corresponding to information that is indicative, probative or otherwise relevant to a position, relative location, or physical state of the SPD 10. Sensor location information 115 can be used by the object detector 120, in combination with image data 113, to determine a relative position for the SPD 10. The information determined for the SPD 10 can include, for example, a distance of the SPD 10 from the controller or reference point in either 1-, 2- or 3-dimensions, or a coordinate of the SPD 10 within a particular reference frame. The information determined from the SPD 10 can also be indicative of a physical state of the device (e.g., LED on device is on, device is going downhill or has hit obstruction, etc.).

In other variations, the position information for the SPD 10 can be communicated by the SPD to the controller 100 via a wireless link (e.g., Bluetooth). For example, the SPD 10 may be self-aware by way of its own geo-aware resources. In particular, the SPD 10 can include sensors and devices such as an accelerometer, a Global Positioning System (GPS) unit, a gyroscope and/or a magnetometer.

The object detector 120 can communicate raw position information 117 to one or more content output components of the controller 100. In one implementation, a coordinate mapping component 122 maps the raw position information 117 to coordinate positions 121 of an alternative reference frame that is specific to a particular virtual environment. The alternative reference frame can be generated and maintained through, for example, the content generation component 124, as part of a virtual environment. The content generation component 124 may independently use content input from, for example, a content library 125 in order to generate aspects of a virtual environment.

In some variations, the content generation component 124 can obtain virtual environment parameters 129 for use in creating specific virtual environments. For example, specific games or gaming scenarios may carry alternative virtual parameters 129. The virtual environment parameters 129 can, for example, (i) map raw position information 117 to virtual coordinates, (ii) convert detected objects into graphical representations (e.g., transfer real-world object into an anime gaming feature), and (iii) provide rules for a physics engine (e.g., application of Newtonian using virtual reference frame). Using the virtual environment parameters 129 and the content library 125, content generation component 124 can update the virtual environment using the raw position information 117 determined from tracking the position of the SPD 10. For example, a graphic representation of the SPD 10 can be reflected in the virtual environment, based on the position information and the alternative coordinate system provided by the coordinate mapping component 122.

As an addition or alternative, the content generation component 124 can include logic to (i) flag certain coordinates (e.g., determined from, or corresponding to raw position information 117) as landmarks or points of interest for future use in a virtual environment, and/or (ii) access a data store of historical content ("historical content store 127") that is based on prior landmarks or points of interest.

The content generation component 124 can provide content output 123 for user interface 110. The user interface 110 can create a presentation that depicts the content output 123. The user interface 110 can also include or modify the content output 123 to allot for input from the user that can affect operation of the SPD 10, as well as to permit manipulation of the content presented. For example, the user interface 110 can include a framework of graphic features that the user can interact with in order to (i) after a virtual aspect provided from content generation component 124, and/or (ii) adjust performance or operation (e.g., speed up, change direction, stop, execute sequence, spin etc.) of the SPD 10.

In more detail, the user interface 110 can include the command interface 112 to enable the user to control the SPD 10. For example, the command interface 112 can correspond to one or more features or aspects of the virtual environment that allow the user to enter input for purpose of controlling movement, operations and other aspects of the SPD 10. As described elsewhere, subsequent control of SPD 10 (e.g., movement) can also affect the virtual environment.

Methodology

Figure 2:
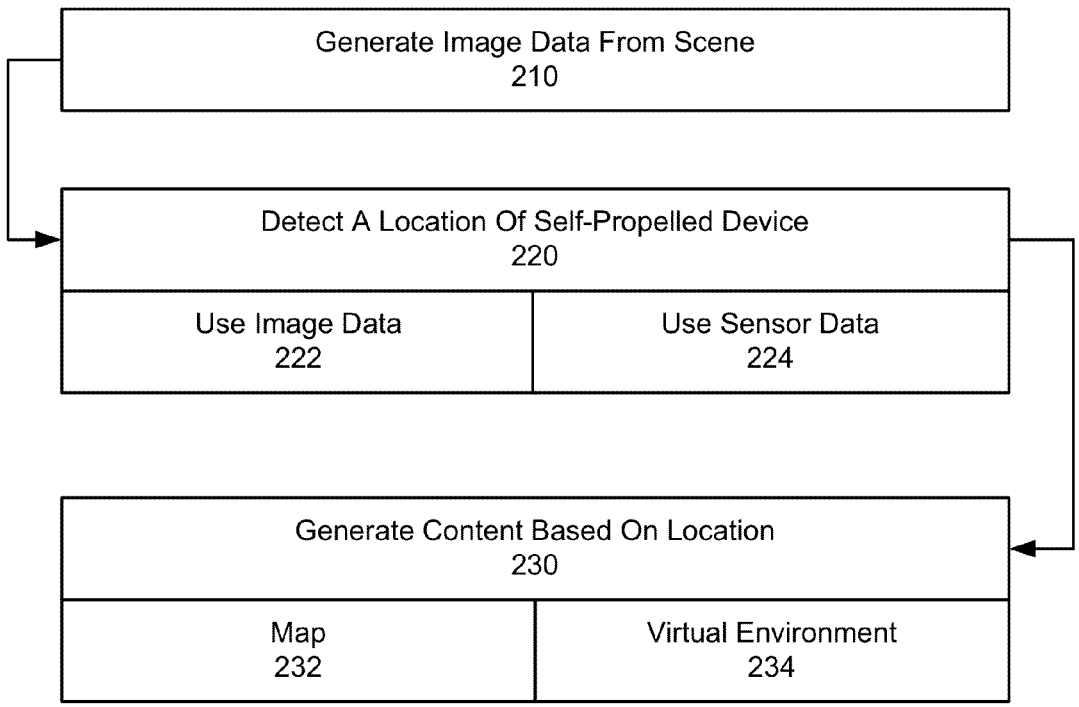
FIG. 2 illustrates a method for controlling a self-propelled device for use in a virtual environment, according to an embodiment.
Figure 3:
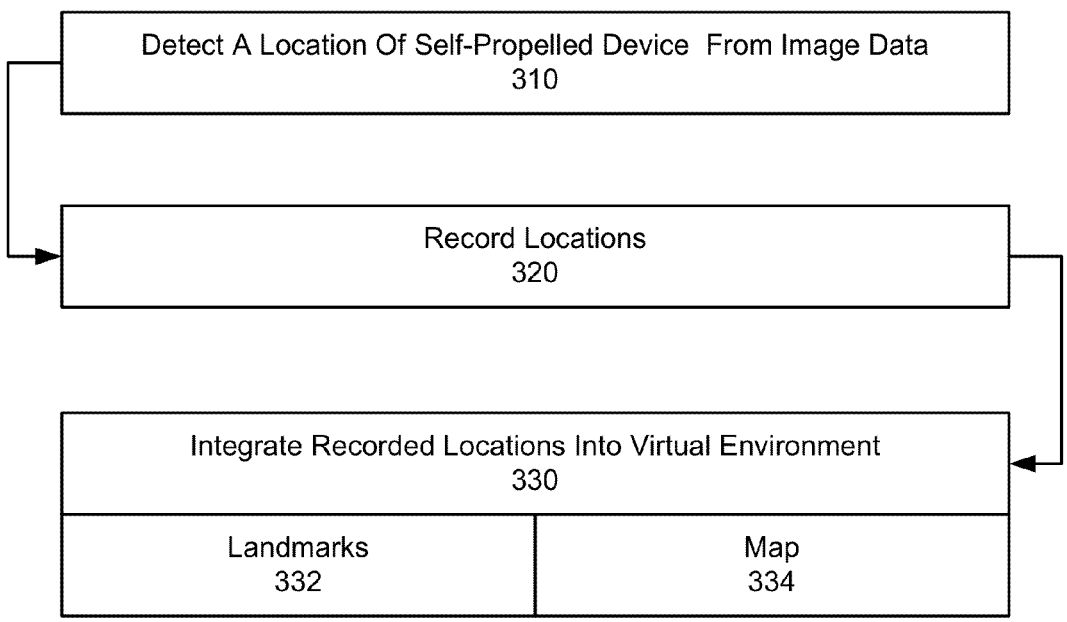
FIG. 3 illustrates a method for implementing a virtual environment for use with a remotely controlled self-propelled device, according to an embodiment.

FIG. 2 illustrates a method for controlling a self propelled device for use in a virtual environment, according to an embodiment. FIG. 3 illustrates a method for implementing a virtual environment for use with a self controlled device, according to an embodiment. Examples such as described with FIG. 2 and FIG. 3 can be implemented using components of the system such as described with FIG. 1. Accordingly, reference may be made to elements of FIG. 2 and FIG. 3 for purpose of illustrating suitable components or elements for performing a step or sub-step being described.

With reference to FIG. 2, image data can be generated for a particular scene in real time, with respect to the operation or movement of a self-propelled device (210). For example, controller 100 can be operated on a computing device that includes a camera. A user can point the camera to capture at the SPD 10 (e.g., operate the camera in video mode) in order to receive image data 113.

A location of a self-propelled device is detected from the scene (220). According to some embodiments, the image data is used to detect a location of the self-propelled device within a given scene. For example, in order to locate the SPD 10, the image processing logic can include object-type specific detectors to locate (i) shapes, such as circles, semi-circles, or portions thereof, in implementations in which the SPD 10 is a sphere, (ii) surface color (e.g., white), (iii) surface ornamentation or mark (e.g., visual code), or (iv) specific characteristic structural features. The image processing logic can also include object-type specific detectors to identify, from the image data objects that are likely to be found in the environment of the SPD 10. For example, object detector 120 can implement image processes to detect walls, rugs, specific kinds of floorings, pet dishes, steps, or lighting conditions that may be present in the environment of the SPD 10.

As an addition or alternative, controller 100 can use sensor data 109, communicated from the SPD 10, in order to determine the position of the SPD in a given scene. For example, SPD 10 can include resources for being aware of its position relative to, for example, controller 100. U.S. patent application Ser. No. 13/342,853, which is incorporated by reference herein, describes various sensor inputs and logic for enabling a device such as SPD 10 be self-aware of its location.

Content is generated based on the location of the SPD 10 (230). In particular, various kinds of virtual content can be generated that are based on movement, physical presence of other aspects of SPD 10 in the real-world environment. In one implementation, the content provided includes a map or other depiction of physical space (232). For example, the SPD 10 can be operated in a room, and a graphic map of the room, or of an alternative environment (e.g. gaming environment, such as a race track) can be generated that is based on the position of the SPD 10.

As an addition or alternative, the generated content can correspond to a virtual environment (234), such as, for example, in environment in which the SPD 10 has a virtual representation, and the surrounding environment is based partly on the real-world environment of the SPD 10. A set of virtual parameters can be determined as part of generating content. For example, a virtual map can be structured, and/or used as a framework or basis for conducting other events and aspects of a virtual environment. The virtual map can be determined from, for example, a path of the SPD, identified landmarks and other events, then translated into an alternative reference frame for the specific virtual environment.

With respect to FIG. 3, the location of a self-propelled device is determined from image data (310). In one implementation, the self-propelled device can have a geometry or shape that is detectable from the surrounding environment when viewed through image data. Dimensional analysis can be performed on the detected shape within the image data in order to determine a relative position (e.g., distance) of the self-propelled device with respect to a particular reference, such as the location where the image is captured (e.g., controller 100). As an example, the self-propelled device can be implemented as a sphere, and image processing logic of the controller can be configured to detect circles are ellipses (or portions thereof) that can correspond to the sphere. Based on the dimensions of the circle or ellipse, the relative position of the self-propelled device can be determined. The relative position can be determined as a coordinate (e.g., in 2- or 3-D), or through single linear dimension such as distance from the point where the image is captured.

In an embodiment, the location of the self-propelled device is recorded as the object moves about its scene (320). Thus, the self-propelled device can be tracked as it moves about. A path can be determined for the self-propelled device based on its past locations in a given timeframe.

The locations of the self-propelled device can be recorded over a given duration (330). For example, the device can be operated in a given time frame, and the movement of the device can be sampled by way of image processing. The self-propelled device can also be tracked so that the device's path can be determined for the given time period. The path or recorded locations of the self-propelled device can then be integrated into a virtual environment. More generally, the position of the self-propelled device can be integrated with content that is otherwise independent of the real-world environment of the self-propelled device.

In particular, some embodiments provide for recording landmarks that the self-propelled device experiences (332). Landmarks can include, for example, a starting point, an obstruction such as a wall or table leg, variations of the underlying surface in which to self-propelled device operates (e.g., type of flooring), variations in lighting (e.g., well lighted place versus dark place), and variations in the gradient of the underlying surface.

As another addition our variation, the recorded path of the self-propelled device can be used to generate a map (334). The map can define geographic parameters that are translated into a virtual environment. For example, the walls of the room can be translated into a track. The path of the object can also be translated into a virtual path. The map can also include the landmarks, as determined in (332).

Example

Figure 4:
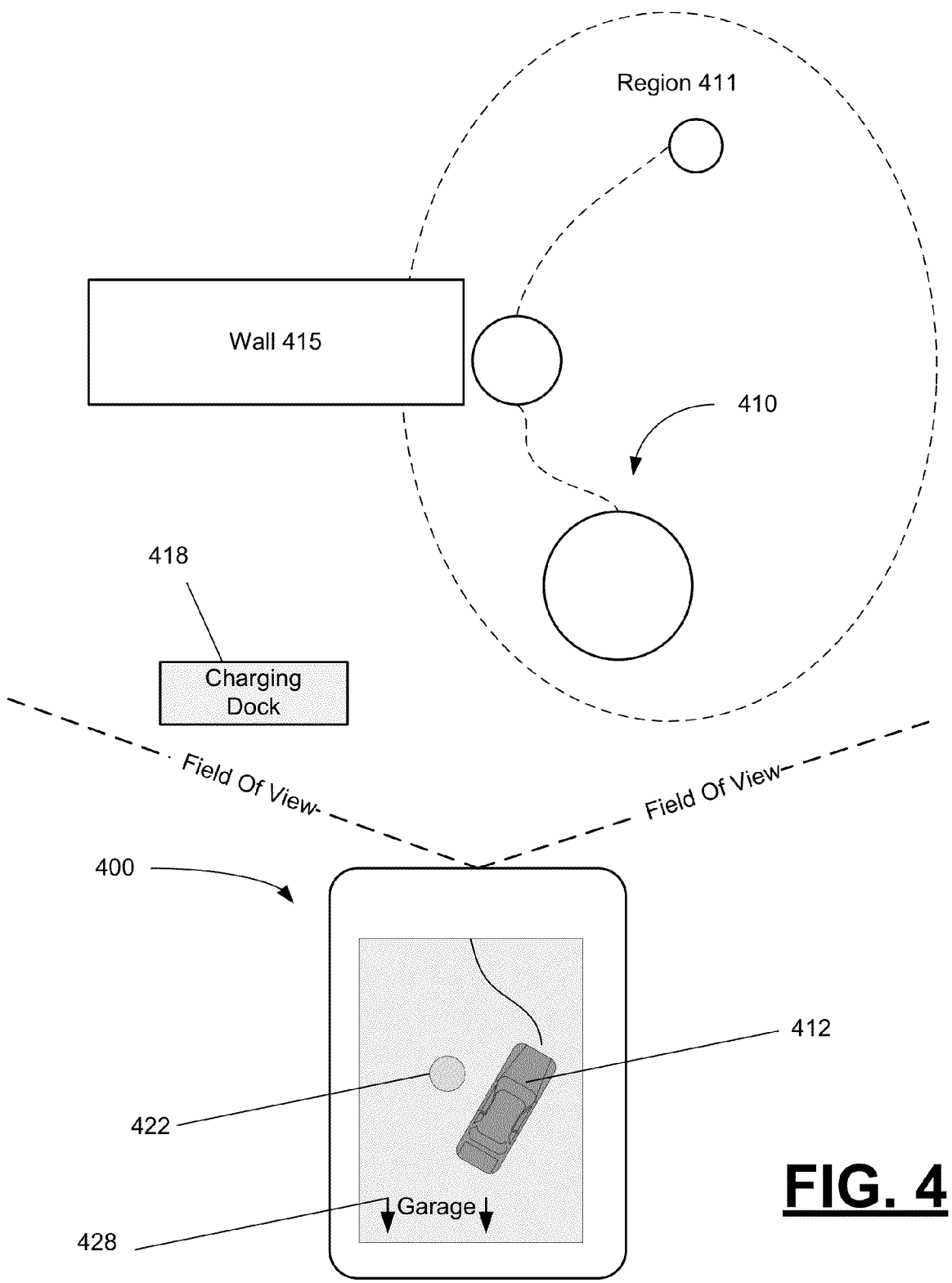
FIG. 4 illustrates an example of a virtual environment on a device that controls movement of another device.

FIG. 4 illustrates an example of a virtual environment on a device that controls movement of another device. In an example of FIG. 4, a mobile device 400 operates as a controller for a self-propelled device 410. In particular, the mobile device 400 can execute software (e.g., downloaded application) which creates virtual environment that is based on the movements of the self-propelled device 410. For example, mobile device 400 can execute different applications, of which each generate separate virtual environments, and each virtual environment can have a corresponding content, theme, simulated physics, and user involvement (e.g., how and what the user can respond to, input features etc.).

A field of view for a camera component 404 of the device 400 can monitor the region 411 for movement or changes to the physical state of the self-propelled device 410. The region 411 can also extend beyond the field of view. For example, the region 411 can encompass multiple rooms or an extended path traversed by the self-propelled device.

In the example of FIG. 4, the mobile device 400 renders a virtual environment in which the self-propelled device is reflected as a vehicle moving about obstacles. Thus, the self-propelled devices depicted in alternative, graphic form. The mobile device 400 may execute an application that coordinates a virtual environment with the real-world events related to the movement of the self-propelled device 410 in a given area. In an example of FIG. 4, the self-propelled device 410 is depicted as an automobile 412 on the mobile device 400. An application, running on the mobile device 400, renders the self-propelled device 410 as a vehicle. A remainder of the virtual environment can reflect hazards or other facets that tie into what the self-propelled device 410 experiences.

According to some embodiments, the self-propelled device can be moved in the real world amongst obstacles, and landmarks or points of interest. A region 411 in which the self-propelled device 410 is moved in the real-world can also be mapped into the virtual environment, and some landmarks or points of interest within the region 411 can be reflected in alternative forms in the virtual environment. For example, real-world obstruction such as walls 415 can be reflected as an obstacle 422 (e.g., one that is smaller in size) in the virtual environment. As another example, a charging dock 418 can be used as a landmark for the self-propelled device in maintaining a point of reference for future use. For example, the location of the charging dock 418 can be recorded and mapped to a virtual garage 428.

In some embodiments, mobile device 400 uses a camera to track the object in a given real-world region. The position of the object in the given region can be reflected in the corresponding virtual environment. Each virtual environment in use on the mobile device 400 can map to the real world based on a set of transformations. Thus, for example, mobile device 400 can use its camera to track the self-propelled device 410, and the position of the self-propelled device (as well as other physical information) can be used to coordinate the position of a virtual object of interest in a corresponding virtual environment.

Additionally, the self-propelled device 410 can be shaped so that it is readily detectable from image data. Still further, the self-propelled device 410 can be shaped so that the relative depth or distance from the mobile device 400 can be determined based on dimensional analysis of the detected shape versus a reference. For example, as shown by an example of FIG. 4, the self-propelled device 410 can be spherical, so that the detected size of the object in the image data can be correlated to a physical distance measure.

Optionally, the mobile device 400 can use sensor input from the self-propelled device, as an alternative or addition to using image data. The self-propelled device can communicate, for example, information determined from the IMU of the device. This information can enable the device to determine its own location relative to a particular reference frame. The device 400 can signal the information to the mobile device 400 using a wireless link.

Controller Hardware Diagram

Figure 5:
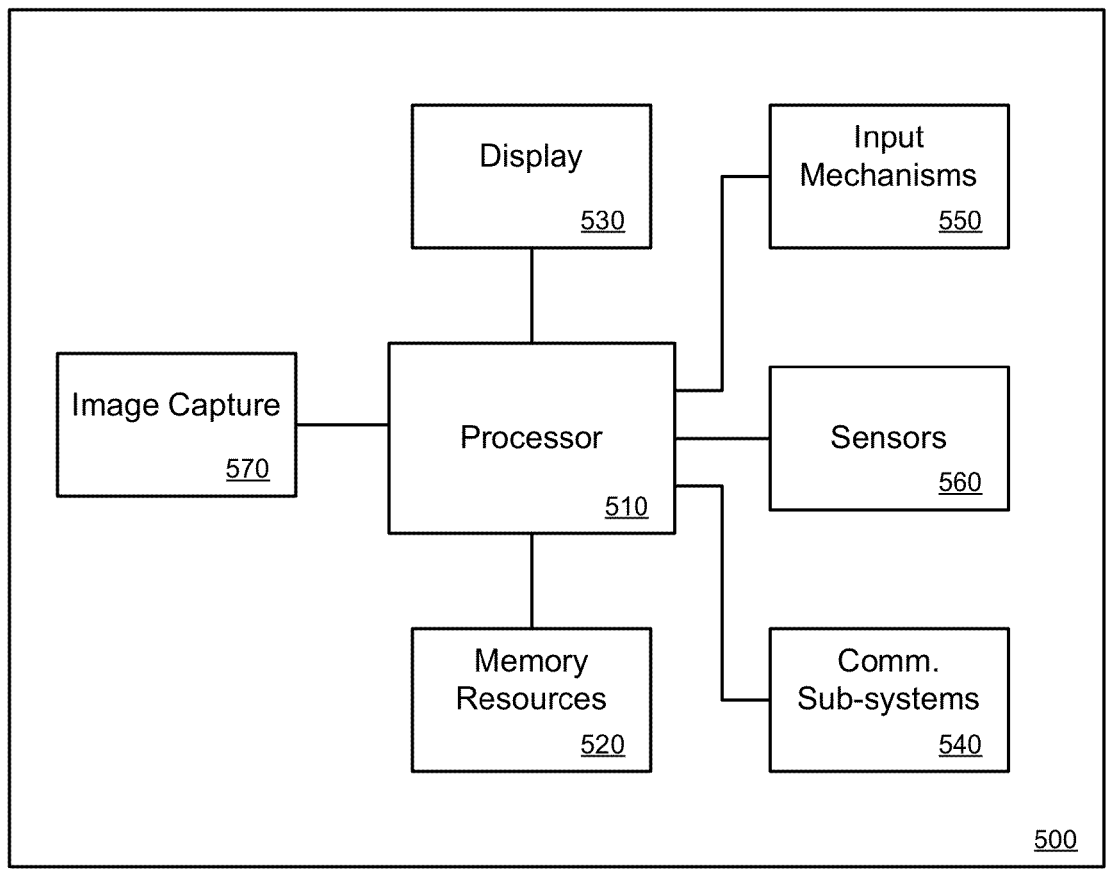
FIG. 5 illustrates an example hardware diagram a computing device on which a controller for a self-propelled device can be implemented.

FIG. 5 illustrates an example hardware diagram a computing device on which a controller for a self-propelled device can be implemented. In particular, a computing device 500 can configured to implement functionality described with, for example, controller 100 as described by some embodiments of FIG. 1. In some implementations, the computing device 500 is a mobile device, such as a cellular telephony messaging device that (e.g., IPHONE model device manufactured by APPLE INC.) or tablet (e.g., IPAD model device manufactured by APPLE INC.) which executes one or more applications for controlling movement and other operations of a self-propelled device. For example, in the context of FIG. 1, system 50 may be implemented by memory and processor resources as described in FIG. 5.

In one embodiment, the computing device 500 includes one or more processors 510, memory resources 520, a display device 530, one or more communication sub-systems 540 (including wireless communication sub-systems), and one or more sensors 560. According to different implementations, the communication sub-systems 540 enables the computing device 500 to exchange wireless communications with a self-propelled device using wireless communication mediums and protocols (e.g., WI-FI, BLUETOOTH, Infrared). In some embodiments, the computing device 500 can also include one or more input mechanisms 550 (e.g., a button, a switch, a touch-sensitive input device).

The processor 510 can be configured with software and/or other logic to perform one or more processes, steps and functions described with the various examples described herein, such as described by FIG. 1 through FIG. 3. Accordingly, the processor 510 can be configured, with instructions and data stored in the memory resources 520, to implement functionality described with controller 100 (as described with FIG. 1). The memory resources 520 may store instructions (e.g., applications) used by the processor 510 in implementing the functionality of the controller 100. For example, the memory resources 520 may store instructions for enabling the processor to (i) determine position information for the self-propelled device, (ii) implement a virtual reality where a graphic representing the self-propelled device is presented, and (iii) communicate and command the self-propelled device.

In performing operations of the controller, the processor 510 may utilize various forms of input. In particular, processor 510 can receive user input via the input mechanisms (e.g., touch sensor integrated with display, buttons, voice input etc.). Furthermore, the processor 510 can also receive sensor input from one or more sensors 560 that are included with the computing device 500. Examples of sensors 560 include accelerometers, proximity sensors, capacitive sensors, light sensors, magnetometers, inertial mass unit (or IMU) or gyroscopes. As described with an example of FIG. 1, processor 510 may also receive image data from image capture device 570, such as a charged-coupled device (CCD) camera that is able to capture video and images.

In one embodiment, the processor 510 can control the display device 530 to provide virtual or "augmented reality"

content. As described with other examples, such content may include alternative graphic representations of a self-propelled device, as well as virtual elements or facets which are affected by real-world events, particularly relating to the position, movement and state of the self-propelled device that is under control of the computing device 500.

Self-Propelled Device

FIG. 6A and FIG. 6B illustrate examples of self-propelled devices, under some embodiments. With reference to FIG. 6A, a self-propelled device 600 can be spherical in shape, and include internal components 622 such as a drive system, sensors (e.g., gyroscope, inertial mass unit (IMU), GPS, accelerometer, light sensor, proximity sensor, etc.), processing resources and communication interface for communicating with a controller using a wireless communication medium (e.g., Bluetooth, Wi-Fi etc.). Numerous examples for the construction and operation of the self-propelled device, in accordance with an example such as provided in FIG. 6A and elsewhere in this application, are disclosed in, for example, U.S. patent application Ser. No. 13/342,863 and U.S. patent application Ser. No. 13/261,647; both of which are hereby incorporated in its entirety by reference.

In some examples, the self-propelled device 600 includes a housing 610 that is substantially spherical. In variations, the housing can be elliptical, semi-spherical, or include spherical portions. Other suitable geometric shapes may also be used. However, one advantage provided by using a spherical shape for the housing 610 is that the shape of the device remain symmetrical when viewed from various angles. This facilitates using image analysis for purpose of locating the object by relative position or distance.

With reference to FIG. 6B, a combination device 650 includes a second device 660 and a spherical housing element 670. The spherical housing element 670 may be modularized so as to be assembled onto the second device 660 as a self-contained unit, either during manufacturing or after-sale. For example, the second device 660 can correspond to a radio-frequency controlled device (e.g., car) that is augmented with the spherical housing element 670 to facilitate detection/position determination with use of image processing. In particular, the exposed spherical aspect of the housing element 670 can be imaged and subjected to dimensional or geometric analysis in order to approximate position information (e.g., distance from camera). As with other examples, the combined device can also include a variety of sensors 672, such as gyroscope, inertial mass unit (IMU), GPS, accelerometer, light sensor, or proximity sensor. For example, the housing element 670 can use wireless communications to signal additional sensor data to a controller device. The sensor data communicated from the sensors can also be indicative or determinative of the position of the housing element 670.

It is contemplated for embodiments described herein to extend to individual elements and concepts described, independently of other concepts, ideas or system, as well as to combinations of elements recited anywhere in this application. Although numerous examples are described in detail with reference to the accompanying drawings, it is to be understood that the embodiments extend beyond the described examples. Furthermore, it is contemplated that a particular feature described either individually or as part of an embodiment can be combined with other individually described features, or parts of other embodiments, even if the other features and embodiments make no mention of the particular feature.

What is claimed is:

1. A computer-implemented method for operating a mobile computing device in control of a self-propelled device, the method comprising:
controlling one or more components on the mobile computing device in order to determine information about the self-propelled device;
receiving input from the self-propelled device, the input including sensor information obtained from sensors on the self-propelled device;
tracking, from at least one of the determined information or the sensor information, a location of the self-propelled device relative to the mobile computing device as the self-propelled device moves; and
generating content based on the location of the self-propelled device as the self-propelled device moves;
wherein generating the content based on the location of the self-propelled device includes generating a virtual environment shared by multiple computing devices, the virtual environment including programmatically determined events and features based at least in part on (i) a set of rules, and (ii) events occurring on other computing devices sharing the virtual environment.

2. The method of claim 1, wherein controlling the one or more components on the mobile computing device includes controlling a camera component of the mobile computing device, and wherein tracking the location of the self-propelled device includes processing data captured through use of the camera component to detect a spherical aspect of the self-propelled device.

3. The method of claim 1, wherein generating the content based on the location of the self-propelled device further includes rendering a graphic representation of the self-propelled device in the virtual environment, and wherein the graphic representation of the self-propelled device is rendered to move in the virtual environment based on the tracked location of the self-propelled device as the self-propelled device moves.

4. The method of claim 3, wherein the virtual environment is based at least in part on a map generated from mapping a physical space in which the self-propelled device moves, and wherein the graphic representation comprises a virtual character that moves about the virtual environment.

5. The method of claim 1, wherein generating the content based on the location of the self-propelled device further includes:
determining a map that corresponds to a physical space in which the self-propelled device moves based on points corresponding to a path determined from detecting multiple locations of the self-propelled device moving in the physical space.

6. The method of claim 5, wherein generating the virtual environment includes generating one or more virtual objects, and locating the one or more virtual objects in the virtual environment based at least in part on the map.

7. The method of claim 6, wherein locating the one or more virtual objects in the virtual environment includes placing the one or more virtual objects in a region determined from the map, wherein the one or more virtual objects are independent of the self-propelled device moving in the physical space.

8. The method of claim 1, wherein the input includes sensor input from one or more sensors including (i) an accelerometer, (ii) a proximity sensor, (iii) a gyroscope, and/or (iv) a magnetometer.

9. The method of claim 1, wherein tracking the location of the self-propelled device includes obtaining a position of the self-propelled device from the self-propelled device.

10. The method of claim 9, further comprising determining location information for the mobile computing device based on the position of the self-propelled device.

11. The method of claim 1, wherein controlling one or more components on the mobile computing device includes controlling a camera component of the mobile computing device, and wherein tracking the location of the self-propelled device as the self-propelled device moves includes processing data captured through use of the camera component to detect at least one of (i) an aspect ratio of the self-propelled device, (ii) a height of the self-propelled device, or (iii) a shape of at least a portion of the self-propelled device.

12. A computer-implemented method for operating a computing device in control of a self-propelled device, the method comprising:
obtaining image data from a camera component provided with or coupled to the computing device, wherein the self-propelled device is included in the image data;
determining a location of the self-propelled device relative to the camera component using the image data; and
generating virtual content, based on the location of the self-propelled device;
wherein generating the virtual content based on the location of the self-propelled device includes generating a virtual environment using programmatically determined events and features based at least in part on (i) virtual content stored on the computing device, and (ii) a set of rules, wherein the set of rules determine an event or feature depicted in the virtual environment based at least in part on tracked movement of the self-propelled device.

13. The method of claim 12, further comprising:
receiving input; and
communicating one or more commands to control movement of the self-propelled device based on the input.

14. The method of claim 12, wherein determining the location includes performing image analysis to detect a spherical aspect of the self-propelled device.

15. The method of claim 14, wherein performing image analysis to detect a spherical aspect of the self-propelled device is performed on a series of frames comprising video input from the camera component.

16. A mobile computing device comprising:
a display;
one or more processors; and
one or more memory resources storing instructions that, when executed by the one or more processors, cause the mobile computing device to:
control one or more components on the mobile computing device in order to determine information about a self-propelled device;
receive input from the self-propelled device, the input including sensor information obtained from sensors on the self-propelled device;
track, from at least one of the determined information or the sensor information, a location of the self-propelled device relative to the mobile computing device as the self-propelled device moves; and
generate content on the display based on the location of the self-propelled device as the self-propelled device moves;
wherein generating the content on the display based on the location of the self-propelled device includes generating a virtual environment shared by multiple computing devices, the virtual environment including programmatically determined events and features based at least in part on (i) a set of rules, and (ii) events occurring on other computing devices sharing the virtual environment.

17. The mobile computing device of claim 16, wherein controlling the one or more components on the mobile computing device includes controlling a camera component of the mobile computing device, and wherein tracking the location of the self-propelled device includes processing data captured through use of the camera component to detect a spherical aspect of the self-propelled device.

18. The mobile computing device of claim 16, wherein generating the content based on the location of the self-propelled device further includes rendering a graphic representation of the self-propelled device in the virtual environment, and wherein the graphic representation of the self-propelled device is rendered to move in the virtual environment based on the tracked location of the self-propelled device as the self-propelled device moves.

19. The mobile computing device of claim 18, wherein the virtual environment is based at least in part on a map generated from mapping a physical space in which the self-propelled device moves, and wherein the graphic representation comprises a virtual character that moves about the virtual environment.

* * * * *